Oct. 16, 1945.     F. W. JOHNSON     2,386,897
SELF-LOCKING STUD OR THE LIKE
Filed Sept. 28, 1944
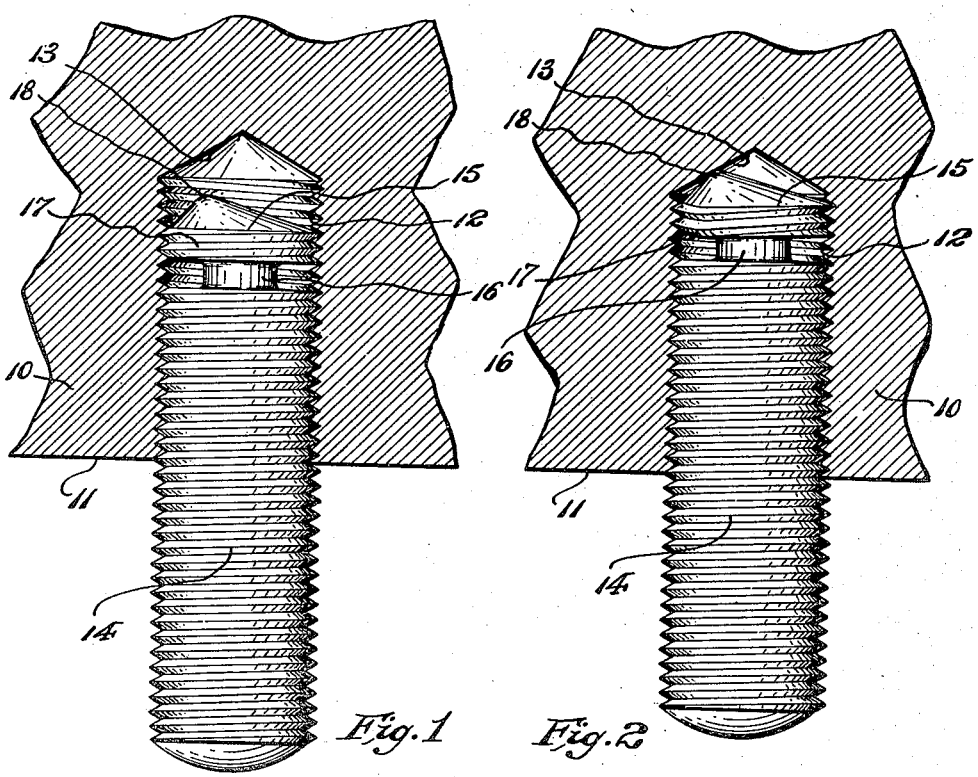
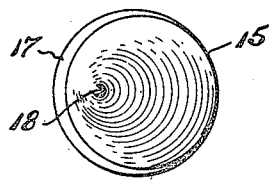
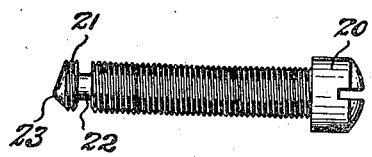
INVENTOR.
Frederick W. Johnson,
BY George D. Richards,
Attorney Patented Oct. 16, 1945

2,386,897

UNITED STATES PATENT OFFICE 2,386,897

SELF-LOCKING STUD OR THE LIKE

Frederick W. Johnson, East Orange, N. J.

Application September 28, 1944, Serial No. 556,177

3 Claims. (Cl. 151—32)

This invention relates, generally, to studs, machine screws and the like; and the invention has reference, more particularly, to a novel construction of stud, machine screw or the like having means unitary therewith operative to lock the same against undesired loosening or out-turning from a part or body into which the same is entered.

This invention has for an object to provide a stud, machine screw or the like with a novel entering end construction which functions, when said stud, machine screw or the like is screwed home into a receiving part or base, to effect a self-locking engagement with the latter, whereby to strongly resist loosening or out-turning of the stud, machine screw or the like therefrom, and thus effectually holding the same in unmovable anchored relation to said part or base member.

The invention has for another object to provide a novel self-locking means for a stud which is threaded into a machine part or base member so as to project externally therefrom, and which is usually adapted to receive application of a nut to its external screw-threaded end portion, whereby to secure another machine part or the like in detachable assembled relation to said first mentioned machine part or base member; said locking means being adapted to anchor the stud against undesired loosening rotation, so that a nut applied thereto may be easily turned on and off its external end portion without risk of loosening the stud or disturbing its anchored stationary relation to the part from which it extends.

The invention has for a further object to provide the inner end of a screw-threaded stud or the entering end of a machine screw or the like with a threaded terminal section connected with the main body thereof by an axial neck portion of substantially reduced diameter, said terminal section having an eccentrically located, outwardly projecting, substantially conical nosing, adapted, when the stud or screw is turned home in an internally screw-threaded receiving socket, to engage the conical end wall of said socket, whereby to exert a generally lateral thrust against said terminal section so as to tilt the same and thereby shift its male threads out of phase with the female threads of said socket, thus jamming the terminal section against out-turning rotation, and thus also obstructing undesired out-turning or loosening of the stud or screw relative to the part into which it is entered.

Other objects of this invention, not at this time more particularly enumerated, will be understood from the following detailed description of the same.

Illustrative embodiments of this invention are shown in the accompanying drawing, in which:

Fig. 1 is a cross-sectional view of an internal screw-threaded socketed part or base, showing a self-locking stud according to this invention partially entered therein; Fig. 2 is a similar view showing the self-locking stud screwed home in said socket with its terminal section tilted or moved into locking relation to the internally threaded socket walls; and Fig. 3 is an inner terminal end elevation of the self-locking stud.

Fig. 4 is a side elevational view of a machine screw provided at its entering end with the self-locking structure according to this invention.

Similar characters of reference are employed in the hereinabove described views to indicate corresponding parts.

Referring to the drawing, the reference character 10 indicates a part or body in which it is desired to mount a stud for external projection from a face 11 thereof. To this end said part or body is provided with an internally screw-threaded outwardly open socket 12 countersunk therein to a suitable depth; said socket terminating in a conical end wall 13. Said socket is diametrically sized to conform to the diameter of stud to be entered therein, and is tapped to provide female screw threads corresponding in size and pitch to those of the stud to be accommodated.

The reference character 14 indicates an externally screw-threaded stud adapted to be entered in the socket 12. At its entering or inner end, said stud is provided with a terminal section 15 of corresponding diameter which is integrally connected with but separated from the main body of the same by an axial neck portion 16 of substantially reduced diameter. Said terminal section 15 is of a length sufficient to provide external screw-threads 17 corresponding in pitch and size to the threads of the main body of said stud. Ordinarily provision of two or three turns of the thread 17 is preferable, although more or less thereof may be utilized. Preferably said neck portion 16 is of a diametric size approximating one-half the diametric size of the main body of the stud and its terminal section. At its outer end face, said terminal section 15 is provided with a nosing 18, substantially conical in form, the apex of which is eccentrically offset relative to the longitudinal axis of the stud and its terminal section.

To assemble the stud 14 with the part or body 10, and to effect the self-locking or anchoring of the former to the latter, the stud is screwed into the internally screw-threaded socket 12 with the terminal section 15 thereof leading. Since the threads 17 of said terminal section 15 correspond in size and pitch to the threads of the main body of the stud, and since said threads 17 are normally or initially in phase with the latter threads, the terminal section 15 and main body of the stud will normally advance into and through the interior of the socket 12 as the stud is screwed home into the latter (see Fig. 1). As the inwardly advancing terminal section 15 approaches the bottom of the socket 12, the eccentrically offset nosing 18 thereof will contact the inwardly inclined surface of the conical end wall 13 of the socket, and, thereafter, as inward turning and advancing axial movement of the stud and its terminal section continues, said nosing 18 will be subjected to a camming action exerted thereupon by the inclined conical wall 13 of said socket, which action combines a strong lateral thrust with the axial movement of the terminal section, and by the resolution of the resultant forces tends to tilt the terminal section 15 from normal horizontal plane transverse to the longitudinal axis of the stud, so that said terminal section inclines downwardly toward that side thereof to which the nosing 18 is most closely adjacent. The neck portion 16, being of substantially reduced diameter and mass, readily yields to this tilting movement of said terminal section. As a consequence of the resultant tilted disposition of the terminal section 15, its threads 17 will be shifted out of phase with those of the main body of the stud and with those of the socket 12, thus jamming the terminal section 15 relative to the socket threads, and probably to some extent deforming said threads 17, all whereby a strong frictional resistance to loosening and out-turning of the stud relative to the socket 12 is set up, so that the stud is thereby firmly self-locked or anchored in the socket against such loosening or out-turning movement (see Fig. 2).

While in the majority of cases the socket 12 is usually provided with a conical end wall, as shown at 13, in some cases such end wall may be flat or substantially flat. In the latter case, when the eccentrically offset nosing 18 strikes such flat wall, substantially the same tilting effect is transmitted to the terminal section 15 as above described, so that the threads 17 of the latter are moved out of phase and jammed with the desired locking and anchoring effect.

It may also be pointed out that the neck-portion 16 may in some instances be omitted, so that the terminal section 15 is continuous with the main body of the stud, for some tilting or jamming effect upon the terminal end portion of the stud will always be produced so long as the eccentrically offset nosing 18 is provided for abutting engagement with the socket end wall.

From the above it will be understood that a very simple and yet extremely efficient self-locking stud is provided, the locking function of which is effected by merely turning the stud strongly in its receiving socket.

As shown in Fig. 4, the above described self-locking features may also, if desired, be incorporated with the entering end of a machine screw 20, by providing said end with a corresponding terminal section 21, connected thereto by a reduced neck-portion 22, said terminal section having on its outer end face an eccentrically offset nosing 23. A machine screw, thus provided with the stated locking features, will functionally perform to obtain the desired self-locking effect, when screwed into a socket prepared for its reception, in the same manner and in accordance with the same principles of operation as hereinabove already set forth.

Having now described my invention, I claim:

1. In combination with a screw-threaded element adapted to be entered in an internally screw-threaded receiving socket having a conical end wall, means for locking said element against undesired out-turning movement from said socket comprising a screw-threaded terminal section cooperative with the internal threads of said socket, a neck portion of substantially reduced diameter connecting said terminal section in axially aligned and offset relation to the entering end portion of said element, and said terminal section having a substantially conical nosing projecting from its free end, the apex of said nosing being eccentrically offset relative to the axis of said element and its terminal section, and said nosing being adapted to engage the conical end wall of said socket for the purposes described.

2. In combination with a screw-threaded element adapted to be entered in an internally screw-threaded receiving socket having a conical end wall, means integral with said element for locking the same against undesired out-turning movement from said socket comprising a terminal section having a limited number of peripheral threads to engage the socket threads, a neck-portion of substantially reduced diameter connecting said terminal section in axially aligned and offset relation to the entering end portion of said element, and said free end face of said terminal section being of conical conformation to provide an advanced nosing having its apex eccentrically offset relative to the axis of said element and terminal section, said apex being adapted to engage the conical end wall of said socket for the purposes described.

3. In combination with a screw-threaded element adapted to be entered in an internally screw-threaded receiving socket having an end wall, means for locking said element against undesired out-turning movement from said socket comprising an axially offset terminal section disposed in normal initial axial alignment with said element, and said terminal section having a substantially conical nosing projecting from its free end, the apex of said nosing being eccentrically offset relative to the axis of said element and said terminal section, and said nosing being adapted to abut and to be laterally displaced by the socket end wall, whereby to cant said terminal section from its normal initial alignment with said element for the purposes described.

FREDERICK W. JOHNSON.